United States Patent [19]

Agulia

[11] 4,389,884
[45] Jun. 28, 1983

[54] REMOTE TIRE PRESSURE INDICATOR

[76] Inventor: Gianluigi Agulia, 30, Viale Japigia, 73100, Lecce, Italy

[21] Appl. No.: 273,348

[22] Filed: Jun. 15, 1981

[51] Int. Cl.³ .............................................. B60C 23/02
[52] U.S. Cl. ...................................... 73/146.5; 340/58
[58] Field of Search ........................... 73/146.5, 146.2; 340/58, 870.31

[56] References Cited

U.S. PATENT DOCUMENTS 4,334,428 6/1982 Fima .................................... 73/146.5

Primary Examiner—Donald O. Woodiel
Attorney, Agent, or Firm—W. Edward Johansen

[57] ABSTRACT

The present invention is a remote system for indicating tire pressure for use in combination with a pressure transducer which is disposed inside a pneumatic tire. The pneumatic tire is placed on a wheel rim. The remote system includes a ferrite rod which is mechanically coupled to the pressure transducer and which is disposed within the pneumatic tire. The remote system also includes a passive circuit including a first coil which is mechanically coupled to the wheel rim, a second coil which is electromagnetically coupled to the ferrite rod, which is slidably coupled to the second coil, and a capacitor, all of which are electrically coupled in series to form a tuned circuit which resonates at a particular frequency which is dependent on the position of the ferrite rod, and a detector which detects the change in frequency at which the first circuit resonates thereby providing a measure of movement of the ferrite rod in response to the change in pressure of the pneumatic tire. The detector includes an oscillating circuit having a coil of several turns on a rod of highly permeable material which is disposed adjacent to the first coil on the wheel rim whereby the passive circuit receives energy from the oscillating circuit. As a result of the linear movement of the ferrite rod there will be a change in the frequency at which the passive circuit resonates thereby producing a voltage across the coil of the oscillating circuit which is linearly proportional to the change of pressure in the pneumatic tire. The detector also includes an amplifier, which amplifies the voltage, of the oscillating circuit and a metering display which displays the amplified voltage.

1 Claim, 4 Drawing Figures

REMOTE TIRE PRESSURE INDICATOR

BACKGROUND OF THE INVENTION

1. Field of the Invention

The present invention relates to a tire pressure indicator and more particularly to a remote tire pressure indicator which is neither mechanically or electrically coupled to the tire.

2. Description of the Prior Art

U.S. Pat. No. 4,334,428, entitled Apparatus for Indicating Parameters Sensed on a Rotatable Wheel, issued to Raoul G. Fima and Jacques E. Mahieux on June 15, 1982, teaches a circuit which is mounted on a rotatable wheel of a vehicle and which varies its resonant frequency in accordance with tire pressure. U.S. Pat. No. 4,283,707, entitled Aircraft Low Pressure Tire Warning System Having Comparator Circuit for Each Axle Pair of a Four Wheel Bogie Configuration, issued to Royce F. Church on Aug. 11, 1981, teaches pressures transducers which coupling transformers electrically couple to a signal processor.

U.S. Pat. No. 4,226,126, entitled Mechanical Displacement-Electrical Signal Transducer, issued to Werner Herdon on Oct. 7, 1980, teaches in order to measure small displacement, for example displacement of a membrane under change of pneumatic pressure applied at opposite sides thereto, a ferromagnetic wire which is stretched between a fixed support and the membrane. An exciter coil, connected to a source of alternating current of suitable strength cyclically reversely magnetizes the ferromagnetic wire. A pick-up coil is electromagnetically coupled to the wire to sense the change of magnetization thereof which will be in the form of sharp needle pulses as the magnetization of the wire changes, the pulse amplitude and pulse width being highly dependent on the strain in the wire and hence on the deflection of the membrane. The wire may be stressed under tension.

U.S. Pat. No. 4,250,759, entitled Digital Readout Gauge, issued to Otto Z. Vago and Frank S. Irlinger on Feb. 17, 1981, teaches a digital readout gauge which may be a tire pressure gauge which is mounted in a small portable housing. A pressure chamber is formed within the housing with a valve core deflator mounted within the housing to depress the core of a standard tire valve and permit the air pressure within the tire to be introduced into the chamber. A wall of the chamber is movable with changes of pressure and a piezoelectric crystal transducer or strain gauge transducer is mounted to be stressed in accordance with movement of this wall to develop an analog voltage in accordance with the air pressure. An electrical circuit is contained within the housing and energizable by a battery carried within the housing. A power switch is actuated to an on condition by movement of the gauge onto the tire valve to energize the electrical circuit with the analog voltage passed to an analog-to-digital converter and then to a digital readout display to display the digital value of the air pressure within the tire.

U.S. Pat. No. 4,195,531, entitled Pressure Detector Using an Average Circuit, issued to Kenji Okamura on Apr. 1, 1980, teaches a pressure detector which includes a spring-loaded diaphragm mounted in a housing to define a pressure chamber to which test fluid is introduced. A pulse generating element is provided to generate an electrical pulse in response to a displacement of the diaphragm when the fluid pressure in the pressure chamber exceeds a predetermined level. An averaging circuit is connected to the pulse generating element to convert the pulses into a signal having a voltage level representative of the mean value of the pressure variation.

At the present time, there are no devices which are able to record the pressure of pneumatic tires on the instrument console of a vehicle. For a period of time a system to measure tire pressure with a gauge inside the vehicle was available to large vehicles, such as buses and trucks. This system used a flexible tube connected to the center of the wheel by a sealed bearing and it gave a relatively good indication of the tire pressure. This mechanism, complicated and with many limitations, is now obsolete. So the modern car of today, having many instruments on the panel, does not have one able to indicate the tire pressure.

Recently, there has been proposed a type of mechanism utilizing a transmitter located inside of the tire and a receiver close to the transmitter located on the body of the car. This type of mechanism has many limitations, including the need to check the electrical supply and the uncertainty that everything is working properly.

SUMMARY OF THE INVENTION

In view of the foregoing factors and conditions which are characteristic of the prior art it is the primary object of the present invention to provide a remote tire pressure indicator which is very reliable, because it has very few components.

It is another object of the present invention to provide a remote tire pressure indicator which uses a passive circuit which is electromagnetically coupled to an external oscillating circuit thereby eliminating the use of an electric transmitter inside the pneumatic tire.

In accordance with an embodiment of the present invention a remote system for indicating tire pressure for use in combination with a pressure transducer which is disposed inside a pneumatic tire is described. The pneumatic tire is placed on a wheel rim. The remote system includes a ferrite rod which is mechanically coupled to the pressure transducer and which is disposed within the pneumatic tire. The remote tire pressure indicator also includes a passive circuit including a first coil which is mechanically coupled to the wheel rim, a second coil which is electromagnetically coupled to the ferrite rod, which is slidably coupled to the second coil, and a capacitor, all of which are electrically coupled in series to form a tuned circuit which resonates at a particular frequency which is dependent on the position of the ferrite rod, and a detector which detects the change in frequency at which the first circuit resonates, thereby providing a measure of movement of the ferrite rod in response to the change in pressure of the pneumatic tire.

The detector includes an oscillating circuit having a coil of several turns on a rod of highly permeable material which is disposed adjacent to the first coil on the wheel rim whereby the passive circuit receives energy from the oscillating circuit. As a result of the linear movement of the ferrite rod there will be a change in the frequency at which the circuit resonates thereby producing a voltage across the coil of the oscillating circuit which is linearly proportional to the change of pressure in the pneumatic tire. The detector also includes an amplifier which amplifies the small signal of the oscillating circuit and a metering display which displays the amplified voltage from the amplifier.

The features of the present invention which are believed to be novel are set forth with particularity in the appended claims.

Other claims and many of the attendant advantages will be more readily appreciated as the same becomes better understood by reference to the following detailed description and considered on connection with the accompanying drawing in which like reference symbols designate like parts throughout the figures.

DESCRIPTION OF THE PREFERRED EMBODIMENT

Figure 1:
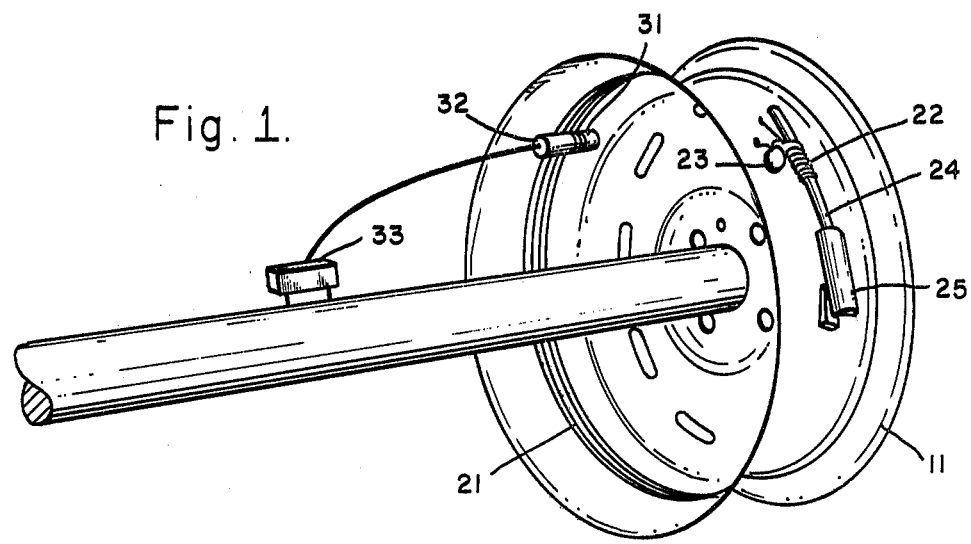
FIG. 1 is a perspective view of a wheel rim on which a remote tire pressure indicator is placed in accordance with the principles of the present invention.

In order to best understand the present invention it is necessary to refer to the description of its preferred embodiment in conjunction with the accompanying drawing. Referring to FIG. 1 a wheel rim 11 on which a pneumatic tire is placed has a system for indicating tire pressure disposed thereon.

Figure 2:
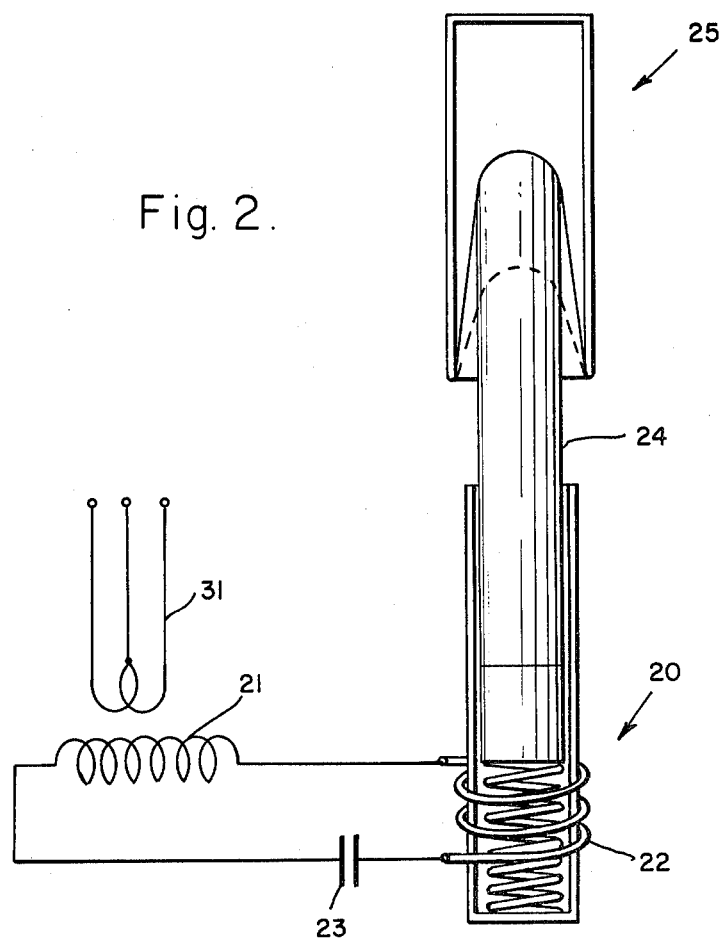
FIG. 2 is a schematic view of the passive resonant circuit which is used in the remote tire pressure indicator of FIG. 1.

Referring to FIG. 2 in conjunction with FIG. 1 the system includes a passive circuit 20 having a first coil 21, which is mechanically coupled to the wheel rim 11, a second coil 22 and a capacitor 23, all of which are electrically coupled in series to form a tuned circuit which resonates at a particular frequency. The passive circuit 20 also includes a ferrite rod 24 which is mechanically coupled to a pressure transducer 25, which is disposed inside the pneumatic tire and on the wheel rim 11. The ferrite rod 24 is also slidably coupled to the second coil 22. The particular frequency at which the first circuit 20 resonates is dependent on the position of the ferrite rod 24 within the second coil 22.

Figure 3:
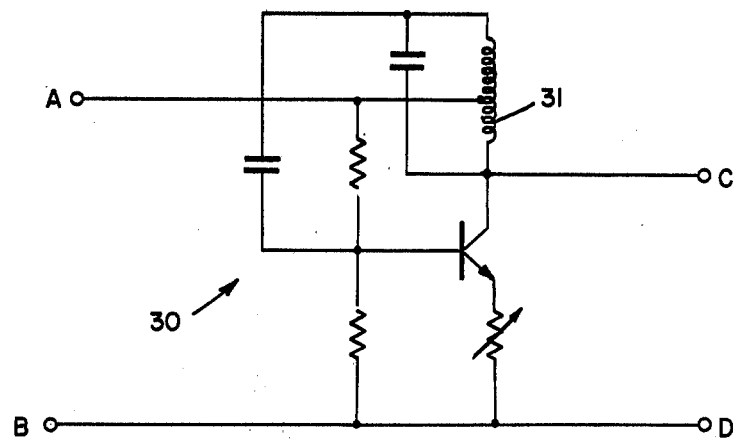
FIG. 3 is the oscillating circuit of the remote tire pressure indicator of FIG. 1.

Referring to FIG. 3 in conjunction with FIG. 1 the system also includes an oscillating circuit 30 having a third coil 31 of several turns on a rod 32 of highly permeable material which is disposed adjacent to the first coil 21 whereby the passive circuit 20 receives electromagnetic energy from the oscillating circuit 30. A result of the linear movement of the ferrite rod 24 which produces a change in the frequency at which the passive circuit 20 resonates thereby producing a voltage across the coil 31, of the oscillating circuit 30, which is linearly proportional to the change of pressure in the pneumatic tire. A connector 33 having a wire support member mechanically couples the oscillating circuit 30 mechanically to the axle on which the wheel rim 11 is mounted.

Figure 4:
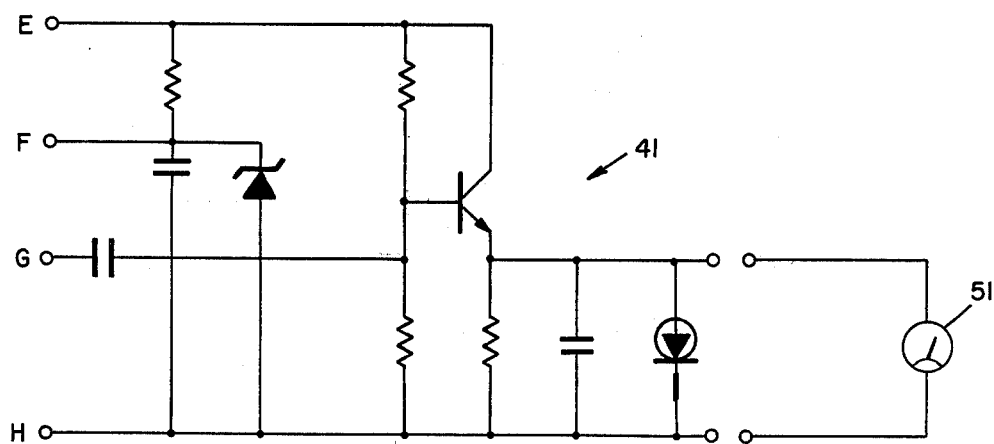
FIG. 4 is the amplifying circuit of the remote tire pressure indicator of FIG. 1.

Referring to FIG. 4 in conjunction with FIG. 3 the system further includes an amplifier 41 which is electrically coupled to the oscillating circuit 30 and a metering display 51 which is electrically coupled to the amplifier 41. Still referring to FIG. 4 in conjunction with FIG. 3 terminals B and D are electrically connected to terminal H, which is electrically connected to ground. Terminal E is connected to a positive voltage source. Terminals A and F are electrically connected as are terminals C and G. The oscillating circuit 30 and the amplifier 41 function as a detector which detects the change of frequency at which the passive circuit 20 resonates in order to provide a measure of movement of the ferrite rod 24 in response to the change in pressure of the pneumatic tire. The pressure transducer 25 consists of a sealed cylinder containing an elastic membrane which moves in direct ratio to the tire pressure.

In operation of the first conduit 20 has its resonance frequency changed by the movement of the ferrite rod 24 thereby making its current absorption less when the tire pressure goes downward and causing the oscillating circuit 30 to begin oscillating. When the tire pressure goes upward, it increases the current absorption. When the oscillating circuit 30 begins to oscillate it produces a voltage which is related to the change of frequency of the first circuit 20. This voltage is amplified by the amplifier 41. The amplified voltage is displayed by the metering display 51.

Accordingly a remote tire pressure indicator has been described which incorporates a passive circuit which is electromagnetically coupled to an external oscillating circuit thereby eliminating the use of an electrical transmitter. It is intended that the foregoing disclosure and showing made in the drawing shall be considered only as an illustration of the present invention. It should be noted that the figures are not drawn to scale and that distance of and between the figures are not to be considered significant.

What is claimed is:

1. A remote system for indicating tire pressure for use in combination with a pressure transducer which is disposed inside a pneumatic tire where the tire is mounted on a wheel rim, said remote system comprising:
   a. a ferrite rod which is mechanically coupled to the pressure transducer and which is disposed within the pneumatic tire;
   b. a passive circuit including a first coil which is mechanically coupled to the wheel rim, a second coil which is electromagnetically coupled to said ferrite rod which is slidably coupled to said second coil and a capacitor, all of which are electrically coupled in series to form a tuned circuit which resonates at a particular frequency which is dependent on the position of the ferrite rod;
   c. an oscillating circuit having a third coil of several turns on a rod of highly permeable material which is disposed adjacent to said first coil of said passive circuit on said wheel rim whereby said passive circuit receives energy from said oscillating circuit and the linear movement of said ferrite rod produces a change in the frequency at which said passive circuit resonates thereby producing a voltage across said third coil of said oscillating circuit which is linearly proportional to the change of pressure in the pneumatic tire;
   d. amplifying means for amplifying the voltage which is electrically coupled to said oscillating circuit; and
   e. displaying means for displaying the amplified voltage which is electrically coupled to said amplifying means.

* * * * *